Patented July 22, 1941

2,250,092

UNITED STATES PATENT OFFICE 2,250,092

METHOD OF PURIFYING ORGANIC MATERIALS

Robert Bangs Colgate, Huntington, N. Y., and Emil Edward Dreger, Summit, N. J., assignors to Colgate-Palmolive-Peet Company, Jersey City, N. J., a corporation of Delaware No Drawing. Application March 28, 1940, Serial No. 326,395

18 Claims. (Cl. 260—504)

This invention is directed to the purification of organic sulphonates and is particularly related to the separation of non-sulphonated organic material from petroleum sulphonate salts.

The removal of non-sulphonated material from organic sulphonates has received much attention in the preparation of relatively pure sulphonate products as valuable wetting, emulsifying and deterging agents. The prior art methods have in most cases been directed to solvent purification procedures, which, although satisfactory in result, are expensive and inconvenient to operate.

The present invention is directed to a method of purifying organic sulphonates to remove organic unsaponifiable material therefrom by an inexpensive procedure without the necessity of costly and highly inflammable solvents.

In accordance with the present invention, an organic sulphonic acid in the form of its salt, after or during saponification, is subjected, in conjunction with a flux or salt that is liquid at temperature desired, e. g., a fatty acid soap, to a properly regulated heat treatment, at relatively high temperatures, while passing a strong current of steam or other inert gas through it, advantageously under reduced pressure, in the substantial absence of air and liquid water.

The addition of the flux, for example, the fatty acid material, or the soap thereof, is an essential feature of the present invention. The treatment of most organic sulphonates alone by this method will not operate because it is not possible to fuse anhydrous salts thereof. However, it has now been found that, when an organic sulphonate salt is admixed with a fatty acid soap, paraffin wax, naphthenic acid soap or similar flux, it is possible to fuse the homogeneous, anhydrous mass and thus permit the passage of inert gas therethrough, and to volatilize the higher boiling non-saponified or non-sulphonated ingredients thereof.

The above treatment removes substantially all of the unsaponified organic material from the saponified mass. The treatment may be carried out at various temperatures, preferably ranging from about 200° to about 350° C. In this temperature range, the substantially anhydrous mixed organic sulphonate-fatty acid soap is in a freely fluid form, such that the inert gas which is passed through it thoroughly agitates it, insuring uniformity of temperature throughout the mass and preventing any portions of the mass, for example, those portions in contact with the walls of the vessel, from being overheated and subjected to decomposition. The strong current of steam or other inert gas which is used serves not only to agitate the liquid mass, but also to assist materially in the vaporization of the unsaponifiable materials which are distilled off and to blanket the mass and exclude air, thus preventing oxidation at the high temperatures used. The unsaponifiable material is vaporized from the saponified mass and is condensed in a suitable condenser substantially free from the steam.

The process cannot be successfully applied to organic sulphonate salts in the absence of a flux, because organic sulphonate salts, when treated alone in this same manner, do not liquefy but usually carbonize and decompose.

The products obtained by the present process are free from objectionable odor and are substantially free from non-sulphonated or unsaponifiable material. The saponified product obtained by the process of this invention is light in color, as the process causes little or no darkening if carried out under proper conditions.

The organic sulphonate-fatty acid soap mixture after the high temperature steam treatment may be used directly as a detergent, or it may be separated into its individual constituents, either directly or by first splitting the salts to the corresponding acids, and then separating the fatty acid from the organic sulphonic acid. The separation may be accomplished in most cases by dissolving the treated salts in water and salting the soap out of the solution. It may also be accomplished by acidification and separation of the aqueous solution of sulphonic acids from the water-insoluble fatty acids. The fatty acids may be water washed to remove residual sulphonic acids. Extraction of the aqueous solution of sulphonic acids with immiscible solvents such as ether or gasoline to remove residual fatty acid therefrom may also be used.

The hot anhydrous salt mixture from the high temperature steam treatment may be cooled by various methods. For example, it may be introduced under the surface of water or a hydrated soap in order to dissolve it more readily. It may be cooled in a suitable pulverizing device, in a spray tower, or on a cooling roll, with or without water, steam or inert gases to exclude air therefrom.

The unsaponifiable material is condensed from the steam and dried with anhydrous sodium sulphate. The mixed soaps show better washing and foaming properties than the mixed material not so treated. The soaps may be split to the acids to obtain relatively pure fractions of organic sulphonic acids and fatty acids as hereinbefore indicated.

The high temperature treatment of the anhydrous soap may be operated so that the organic sulphonic acid may be added with naphthenic acid or fatty acid soap and alkali, or the two salts may be added together individually, or the organic sulphonic acids and fatty acid or the like may be added with alkali. It is important that the soap or the organic acid and alkali is present when it is attempted to liquefy the anhydrous organic sulphonate salt. When starting with a hydrated salt mixture, care must be taken during the initial stages of the heating to prevent local overheating and decomposition at the surfaces of contact between the vessel and the product. One way to carry out the treatment, starting with the aqueous saponified material, is to maintain a body of some of the anhydrous salt mixture at the relatively high temperature of 200° to 350° C., at which it is thinly fluid, and to add the rest of the material at a rate not substantially greater than the rate at which it may be heated to the temperature necessary for fluidity, and to operate the process with continuous or successive additions of crude material and withdrawals of treated material. An advantageous method is to heat the single or a mixed salt solution under pressure and to flash it into the treating vessel alone or by means of superheated steam, thereby introducing the salt or salts in a substantially anhydrous fused condition.

When the lower temperatures, in the neighborhood of 200° to 250° C., are used for the high temperature steam treatment, a longer time of treatment is generally required to provide the substantially complete separation of the unsaponifiable constituents. The time required for this separation will vary with the temperature of the treatment, the pressure maintained within the vessel, and the amount of steam used. It will also vary somewhat with the particular sulphonic acids and fatty acids treated, as some preparations of organic sulphonic acids or fatty acid materials contain more unsaponifiable material, or less volatile unsaponifiable material, than other raw materials. In general, the rapidity of separation of unsaponifiable material is greater at higher temperatures, at higher vacua, and with injection of greater quantities of steam. The process is more rapid and greater at higher temperatures, for example 300° to 325° C., than at lower temperatures, for example 225° to 250° C. In general, temperatures of 250° to 300° C. are preferred. In some cases, temperatures in excess of 350° C. may be used, but it is advantageous to avoid the use of such high temperatures because of the danger of decomposition.

*Example I*

Two hundred (200) grams of tall oil acids, which had been previously treated in the form of its anhydrous soap with steam in an inert atmosphere at a temperature of about 300° C. and which tall oil acids had an unsaponifiable content of 0.26%, were heated in a four neck flask with 38 grams of soda ash, while superheated steam was continuously passed therethrough. When the temperature had reached 250° C., and all of the tall oil-soda ash mixture was in the reaction vessel, 792 grams of an aqueous solution of a mixture of sodium sulphate and the sodium salts of sulphonic acids of a mineral oil extract prepared by the process described in U. S. Patent No. 2,149,661 were gradually added from a dropping funnel. The treatment with superheated steam was continued for about ½ hour at a maximum temperature of about 300° C. The time of treatment was about 3 hours. The original oil content of the sulphonate solution was 131 grams, about 118 grams of which were separated as a distillate with the steam. The mixed salts were dissolved in water and acidified with dilute sulphuric acid. The water-insoluble organic carboxylic acids are separated from the lower aqueous layer of sulphonic acids. The carboxylic acids are washed with water and the aqueous liquid added to the sulphonic acid solution. The solution was neutralized with caustic soda solution and the product dried. Another portion of non-treated mineral oil extract sulphonate salt solution was extracted with ethyl ether directly to remove non-sulphonated material, and the washing and foaming efficiencies of the products prepared by each method were compared. No substantial difference in the products was observed.

Lower proportions of flux and/or lower temperatures may be used, if sodium sulphate or like inorganic salts are not present in the sulphonate salt material under treatment. One means for accomplishing this result is to add fatty acid, naphthenic acid, or other fluxing acids or their soaps to an aqueous solution of sulphuric acid and the organic sulphonic acids, while forming or adding inorganic salts to the mixture so that a layer of fatty acids and organic sulphonic acids floats on a lower aqueous sulphuric acid, salt solution. This layer may be separated and treated according to the present process.

The organic sulphonic acids which may be treated by the present process include sulphonated mineral oil, conventional mineral oil refinery sludges, sulphonated mineral oil extracts, e. g., the products described in U. S. Patents Nos. 2,149,661, 2,149,662 and 2,179,174; sulphonated fatty acids; long-chain aliphatic sulphonates and sulphates such as cetyl sulphonic acid; aliphatic ether sulphonates such as dodecyl ether of hydroxyl ethyl sulphonic acid; sulphonates prepared by treatment of organic materials with sulphuryl chloride and an activating agent, and hydrolysis of the products such as those mentioned in U. S. application Serial No. 310,214 filed December 20, 1939; sulphonic acids of naphthenes and naphthenic acids; aromatic and alkylated aromatic sulphonic acids such as naphthalene sulphonic acid, lauryl benzene sulphonic acid and stearyl naphthalene sulphonic acid; and innumerable other organic sulphonic acid derivatives or mixtures thereof.

Various alkaline materials may be used for the saponification, including carbonated alkalies, soda ash, potassium carbonate, limestone, marble dust, magnesium carbonate, dolomite, caustic alkalies, etc., or mixtures thereof. When employing sodium hydroxide, lime and caustic potash with the sulphonic acids, particularly aromatic sulphonic acids, the alkali should not be in excess of that required for neutralization in order to prevent de-sulphonation of the product. It is also desirable to have sodium sulphite present during the treatment to prevent this decomposition. Soda ash is preferred because it is cheap, effective, and produces a directly usable sodium soap. It will be necessary to vary the temperatures used if other alkaline materials than caustic soda or soda ash are used, because of the differences in the melting points of the soaps formed with metals other than sodium. In any event, the temperature must be sufficiently high to insure the necessary fluidity.

It is possible to add the organic fluxing acid materials in various forms to the organic sulphonates at any point during the process. For example, various oils, fats and waxes may be added to the crude organic sulphonate before any processing has been effected to remove various impurities which they contain. Suitable addition agents are wool fat, certain grades of garbage grease, whale oil, shark, menhaden and other fish oils, spermaceti, tallow, coconut oil, olive oil, tall oil, cottonseed oil, linseed oil, China-wood oil, oiticia oil, soya bean oil, palm oil, montan wax, carnauba wax, Japan wax, Chinese wax, oxidized petroleum, rosin, as well as the various individual acids thereof, such as caproic, lauric, stearic, palmitic, oleic, myristic, abietic, naphthenic, or behenic acids, their halogenated derivatives or mixtures of any of these fats, oils, waxes, resins and acids. The addition agent or agents should be selected so that the salt or salts thereof melt in the desired range and do not decompose. The preferred acid would be one which also has a low boiling point, such as naphthenic acid, lauric acid, capric acid, or myristic acid or coconut oil, so that the mixed acids obtained by acidulation of the mixed salts may be readily fractionated to recover the individual fatty acids and organic sulphonic acids.

The various new sulphonate compositions may also be used in combination with any of the common auxiliary agents. Suitable addition agents include coloring matter, such as dyes, lakes, pigments; abrasives and fillers such as silica, pumice, feldspar, precipitated chalk, infusorial earth, bentonite, talc; solvents and diluents including carbon tetrachloride, perchlorethylene, trichlorethylene, glycerine, water, ethyl alcohol, glycol, tetrahydrofurfuryl alcohol, phenol, cyclohexanol, water, tetralin, decalin, pine oil, mineral oil, mineral oil extracts, and naphtha; perfumes and deodorants; germicides such as phenol and organic or inorganic mercury compounds; any of the common water-soluble alkali metal or ammonium salts, and various mixtures thereof. The type of addition agent to be used will depend, of course, on the ultimate use of the new, purified composition. The various ingredients may be mixed by any of the common methods such as milling, stirring, kneading, crutching, fusing, and drying of mixed solutions or dispersions.

As many widely different embodiments of the invention may be made without departing from the spirit and scope thereof, it is to be understood that the application is not limited to the specific proportions or embodiments thereof except as defined in the following claims.

We claim:

1. The process of purifying organic sulphonates which comprises heating an organic sulphonate and a fluxing material with a saponifying reagent, in an inert atmosphere and in the substantial absence of liquid water, to a temperature not lower than the melting point of the reaction mixture throughout the treatment, meanwhile passing a stream of inert gas through the molten mixture.

2. The process of purifying organic sulphonates which comprises heating an organic sulphonate and a carboxylic acid fluxing agent with a saponifying reagent, in an inert atmosphere and in the substantial absence of liquid water, to a temperature not lower than the melting point of the reaction mixture throughout the treatment, meanwhile passing a stream of inert gas through the molten mixture.

3. The process of purifying organic sulphonates which comprises heating an organic sulphonate and a fatty acid material with a saponifying reagent, in an inert atmosphere and in the substantial absence of liquid water, to a temperature not lower than the melting point of the reaction mixture throughout the treatment, meanwhile passing a stream of inert gas through the molten mixture.

4. The process of purifying organic sulphonates which comprises heating an organic sulphonate and a saponifiable fluxing agent with a saponifying reagent, in an inert atmosphere and in the substantial absence of liquid water, to a temperature at which the reaction mixture is thinly fluid throughout the treatment, meanwhile thoroughly agitating the mixture with a stream of inert gas.

5. The process which comprises heating, in the substantial absence of air and liquid water, a mixture of an organic sulphonate salt and a low melting carboxylic acid soap, to a temperature below 350° C. but not lower than the melting point of the substantially anhydrous mixture, meanwhile passing a stream of steam through the molten mixture.

6. The process which comprises heating, in an inert atmosphere and in the substantial absence of liquid water, a mixture of an organic sulphonate salt and a low melting carboxylic acid soap to a temperature below 350° C. but not lower than the melting point of the substantially anhydrous mixture, meanwhile passing a stream of inert gas therethrough.

7. The process which comprises heating, in the substantial absence of air and liquid water, a mixture of an organic sulphonate salt and a low melting carboxylic acid soap, to a temperature below 350° C. but not lower than the melting point of the substantially anhydrous mixture, while passing a stream of inert gas therethrough in order to remove volatile non-saponifiable materials therefrom, acidifying the remaining salt mixture to free the acids thereof, and fractionating the acids to relatively pure organic sulphonic acid and carboxylic acid fractions.

8. The process of purifying mineral oil sulphonates which comprises heating a mineral oil sulphonate and a fluxing material with a saponifying reagent, in an inert atmosphere and in the substantial absence of liquid water, to a temperature not lower than the melting point of the reaction mixture throughout the treatment, meanwhile passing a stream of steam through the molten mixture.

9. The process of purifying sulphonates of mineral oil extracts which comprises heating an aromatic mineral oil extract sulphonate and a carboxylic acid fluxing agent with a saponifying reagent, in an inert atmosphere and in the substantial absence of liquid water, to temperatures not lower than the melting points of the reaction mixture throughout the treatment, meanwhile passing a stream of inert gas through the molten mixture.

10. The process of purifying aromatic sulphonates which comprises heating an aromatic sulphonate and a fatty acid material with a saponifying reagent, in an inert atmosphere and in the substantial absence of liquid water, to temperatures not lower than the melting points of the reaction mixture throughout the treatment, meanwhile passing a stream of inert gas through the molten mixture.

11. The process of purifying mineral oil sulphonates which comprises heating a mineral oil sulphonate and a saponifiable fluxing agent with a saponifying reagent, in an inert atmosphere and in the substantial absence of liquid water, to temperatures at which the reaction mixture is thinly fluid throughout the treatment, meanwhile thoroughly agitating the mixture with a stream of inert gas.

12. The process which comprises heating, in the substantial absence of air and liquid water, a mixture of a mineral oil sulphonate salt and a lower melting carboxylic acid soap, to a temperature below 350° C. but not lower than the melting point of the substantially anhydrous mixture, meanwhile passing a stream of steam through the molten mixture.

13. The process which comprises heating, in an inert atmosphere and in the substantial absence of liquid water, a mixture of a mineral oil sulphonate salt and a low melting carboxylic acid soap to a temperature below 350° C. but not lower than the melting point of the substantially anhydrous mixture, meanwhile passing a stream of inert gas therethrough.

14. The process which comprises heating, in the substantial absence of air and liquid water, a mixture of a mineral oil sulphonate salt and a low melting carboxylic acid soap, to a temperature below 350° C. but not lower than the melting point of the substantially anhydrous mixture, while passing a stream of inert gas therethrough in order to remove volatile non-saponifiable materials therefrom, acidifying the remaining salt mixture to free the acids thereof, and fractionating the acids to relatively pure mineral oil sulphonic acid and carboxylic acid fractions.

15. A process of purifying mineral oil sulphonates which comprises reacting a mineral oil extract sulphonic acid and a carboxylic acid fluxing agent with an alkaline material in an inert atmosphere, in the substantial absence of liquid water, and at temperatures not lower than the melting points of the reaction mixture throughout the treatment, meanwhile passing a stream of inert gas through the molten mixture.

16. The process of purifying mineral oil sulphonates which comprises reacting a mineral oil sulphonate and a naphthenic acid material with a metal carbonate, in the substantial absence of air and liquid water, and at temperatures not lower than the melting points of the reaction mixture throughout the treatment, meanwhile passing a stream of inert gas through the molten mixture.

17. The process of recovering high boiling non-sulphonated material from organic sulphonates and for purifying organic sulphonates which comprises passing an inert gas through a mixture of an organic sulphonate salt and a fatty acid soap at temperatures above the melting points of the mixture throughout the treatment and, in the substantial absence of air and liquid water, condensing the vaporized unsaponifiable material, acidifying the unsaponifiable-free salt mixture to liberate the acids, and fractionating the acids to obtain substantially pure organic sulphonic acid and carboxylic acid fractions.

18. The process of purifying aliphatic sulphonic acid material which comprises reacting an aliphatic sulphonic acid and a fluxing carboxylic acid with a saponifying reagent, heating the salts thereof, in the absence of air and liquid water, to a temperature above the melting point of the anhydrous salt mixture, while passing a strong current of inert gas therethrough to agitate the mass and to separate the unsaponifiables therefrom.

ROBERT BANGS COLGATE.
EMIL EDWARD DREGER.